United States Patent [19]

Mann

[11] Patent Number: 5,738,140
[45] Date of Patent: Apr. 14, 1998

[54] ADJUSTABLE HEIGHT EXTENSION STEM AND VALVE BOX ASSEMBLY

[75] Inventor: Jerry Thomas Mann, Birmingham, Ala.

[73] Assignee: American Cast Iron Pipe Company, Birmingham, Ala.

[21] Appl. No.: 773,779

[22] Filed: Dec. 26, 1996

[51] Int. Cl.$^6$ .............................. F16K 37/00; F16L 27/08; F16L 27/12

[52] U.S. Cl. .................... 137/369; 137/370; 137/371; 137/556; 116/277; 285/303; 285/348; 285/354; 285/356

[58] Field of Search ................. 137/294, 295, 137/296, 368, 369, 370, 371, 426, 434, 553, 556; 285/303, 322, 321, 348, 354, 355, 356, 357; 116/277

[56] References Cited

U.S. PATENT DOCUMENTS

| | | | |
|---|---|---|---|
| 28,069 | 4/1860 | Fortune et al. | 116/277 |
| 307,753 | 11/1884 | Earle | 137/369 |
| 413,714 | 10/1889 | Freeman | 116/277 |
| 414,546 | 11/1889 | Kallaher | 137/369 |
| 618,753 | 1/1899 | Ward et al. | 137/369 |
| 667,265 | 2/1901 | Tyler | 137/369 |
| 906,886 | 12/1908 | Jacob | 137/371 |
| 948,001 | 2/1910 | Tyler | 137/369 |
| 951,927 | 3/1910 | Whitney | 116/277 |
| 954,437 | 4/1910 | Jacob | 137/369 |
| 961,178 | 6/1910 | Tyler | 137/369 |
| 986,847 | 3/1911 | Nair et al. | 137/371 |
| 996,956 | 7/1911 | Walcott | 137/370 |
| 997,412 | 7/1911 | Paradine | 137/369 |
| 1,251,792 | 1/1918 | Lofton | 116/277 |
| 1,325,393 | 12/1919 | Calhoun | 137/369 |
| 2,515,837 | 3/1950 | Quinn | 137/556 |
| 2,767,681 | 10/1956 | Pontius | 116/277 |
| 2,827,914 | 3/1958 | Alters | 137/364 |
| 3,297,050 | 1/1967 | Rider | 137/556 |
| 3,537,471 | 11/1970 | Houle | 137/370 |
| 3,554,160 | 1/1971 | Fortune | 116/277 |
| 3,656,504 | 4/1972 | Topinka | 116/277 |
| 3,693,647 | 9/1972 | Saar | 137/363 |
| 3,797,518 | 3/1974 | Holm et al. | 137/434 |
| 4,297,966 | 11/1981 | Liberman | 116/277 |
| 4,325,405 | 4/1982 | Christo | 137/371 |
| 4,340,082 | 7/1982 | Straus | 137/426 |
| 4,411,288 | 10/1983 | Gain, Jr. | 137/363 |
| 4,448,148 | 5/1984 | Gain, Jr. | 116/277 |
| 4,497,340 | 2/1985 | Gain, Jr. | 137/556 |
| 4,653,531 | 3/1987 | Gain, Jr. | 137/556 |
| 4,655,160 | 4/1987 | Ligh | 116/277 |
| 4,702,275 | 10/1987 | Ballum et al. | 137/556 |
| 5,220,942 | 6/1993 | Garvin, Jr. et al. | 137/556 |

*Primary Examiner*—George L. Walton
*Attorney, Agent, or Firm*—Kerkam, Stowell, Kondracki & Clarke, P.C.; John C. Kerins

[57] ABSTRACT

An adjustable-height extension stem and valve box assembly is provided for use with buried valves that is lightweight, readily adjustable to a large range of heights, and is capable of absorbing loads and impacts such that the loads and impacts are substantially not transmitted to the buried valve or surrounding pipeline. The valve box is made up of a valve box base, a valve box lower section, a valve box upper section that telescopes within the lower section, and a valve box top. An upper section of the extension stem extends from the interior of the valve box top through a bottom opening, and an extension stem lower section extends downwardly from the upper section, with the two sections being made from square hollow metal tubing such that the upper section telescopes within the lower section. A grit washer having grooves cut in a bearing surface is attached to the extension stem upper section and supports the upper section in place within the valve box top. The valve box upper and lower sections are quickly secured at a desired height or extension by a reducer coupling and a reducer cap which operate to compress an O-ring against an outer surface of the valve box upper section to seal and support the upper section in the desired position.

20 Claims, 3 Drawing Sheets

5,738,140

ADJUSTABLE HEIGHT EXTENSION STEM AND VALVE BOX ASSEMBLY

BACKGROUND OF THE INVENTION

1. Field of the Invention

The present invention relates to an adjustable-height extension stem and valve box assembly for use in actuating, from ground level, a buried valve.

2. Description of Related Art

Pipelines buried below ground level normally have valves placed in the line to control or regulate fluid flow through the pipeline. The buried valves are actuated from ground level. One known method for actuating the valve is to use a wrench that is of sufficient length to extend down and be coupled to a valve nut, which can then be turned by the wrench. A soil pipe or valve box generally is used to extend from the upper ground surface down to the top of the valve. The extension wrench is used by viewing the valve nut and lowering the valve wrench through the soil pipe or valve box until the valve wrench is coupled to the valve nut. In such systems, difficulty in performing this task may be experienced when a shifting of the soil pipe or valve box relative to the valve brings the soil pipe or valve box into contact with, or into close proximity to, the valve nut.

Another known system for allowing valve actuation to be effected is to provide a soil pipe or valve box with an extension stem, connected at its lower end to the buried valve and extending through the soil pipe to an upper end disposed at ground level and having a properly configured valve nut shape. Actuation of the valve in this system is effected by removing a cover from the soil pipe or valve box to expose the ground level extension nut, and connecting a suitable wrench to the extension nut for turning the nut to actuate the valve.

In this type of system, before the extension assembly is manufactured, the distance from the valve to the ground level must be conveyed to the manufacturer of the extension assembly, as the extension member is of fixed length and is coupled to the valve by a pinned connection or set screw connection. Many times, this distance or dimension is taken from drawings, or otherwise calculated, and is not taken from an actual measurement, as, especially in new installations, the scheduling and efficient conduct of the project does not permit time to take actual measurements after installation of the valve box, and to later go back and install the extension assemblies.

The actual ground level-to-valve distance often varies from the dimension used to manufacture the extension assembly, and may require a shorter or longer extension than that supplied. The task of providing a properly sized extension member in such situations is, at best, difficult, and can be impossible, without ordering a replacement piece.

Various devices have also been proposed in the art for allowing an adjustment to be made for the ground level-to-valve distance. Such prior art devices often had several disadvantages associated therewith. For example, some devices had an adjustable-height telescoping outer casing that was locked at the desired height by set screws. Such designs have the disadvantage of transferring all above-ground forces or loads experienced by the valve box to the valve itself or to the pipe immediately adjacent the valve, giving rise to the possibility of damaging or rupturing the buried components. Still other designs do not provide adequate support between the telescoping members to maintain the desired height without the assistance of the dirt packed around the elements. Such designs have the disadvantage that the back fill of dirt must be accomplished right after the desired height of the device is set, or risk having the setting disrupted. Additionally, if the ground shifts in any way, that could disturb the proper positioning of the extension elements.

It is therefore a principal object of the present invention to provide an adjustable-height valve box assembly carrying an adjustable-height extension stem in its interior, which is capable of absorbing loads experienced at ground level substantially without transmitting such loads or forces to a buried valve, and which is capable of being substantially self-supporting at a desired extension height.

It is a further important object of the present invention to provide a lightweight adjustable-height valve box assembly.

It is a further important object of the present invention to provide a valve box and extension member assembly in which an upper extension member is supported in position by the valve box top and a grit washer which will remove grit from the surfaces which are in moving contact with each other. It is an additional important object of the present invention to provide a valve box top assembly and an adjustable-height extension member that can be installed in existing valve boxes which did not originally have extension members.

SUMMARY OF THE INVENTION

The above and other objects of the present invention are achieved in the present invention by providing an adjustable-height valve box and extension stem in which the valve box and the extension stem are each made up of a pair of telescoping elements that can be extended or contracted in concert with one another to provide a valve box of a desired height and to provide a properly positioned extension member. The valve box employs an O-ring to both seal the gap between the upper and lower telescoping members, and, in conjunction with a reducer cap, to compress to retain the upper member in the desired position relative to the lower member. The design allows for a stable assembly that is able to remain at the desired height in a self-supporting mode, while also providing the feature that the valve box can absorb excessive top loads without transmitting the same to the underlying valve, by overcoming the compressive forces and friction between the O-ring and the upper member.

The valve box assembly further provides a drop-and-turn locking cover, and a grit washer employed to retain the upper extension stem member in the valve box top and to operate to remove or channel grit away from the rotating member atop the extension stem. The valve box is principally made of an engineering polymer resin, such as polyethylene, to reduce the weight of the overall assembly, as compared to conventional products.

The upper and lower extension stem members are made of hollow steel mechanical tubing, providing a weight savings over devices that employ one hollow member and one solid bar member. The upper extension stem element also has, at its lower end, a spacer that stabilizes the element longitudinally with respect to the lower extension stem element. The lower extension stem element has a similar spacer at its upper end. The spacers reinforce the stem for better torque transmission between the elements.

BRIEF DESCRIPTION OF THE DRAWINGS

These and other features of the present invention and the attendant advantages will be readily apparent to those hav

DETAILED DESCRIPTION OF THE PREFERRED EMBODIMENT

Figure 1:
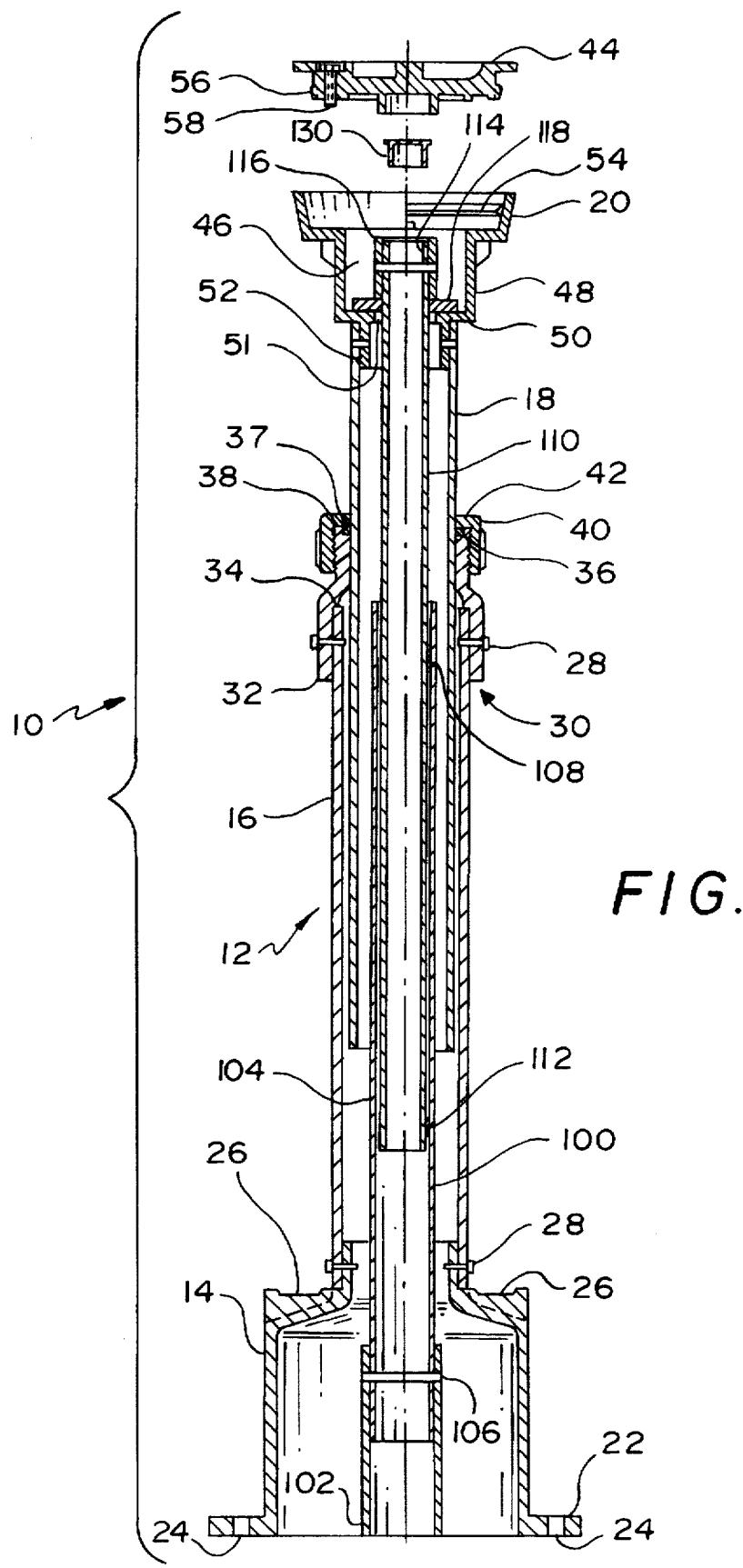
- FIG. 1 is a cross-sectional side view of the adjustable extension stem and valve box assembly according to a preferred embodiment of the present invention.

Referring initially to FIG. 1, the adjustable extension stem and valve box assembly 10 according to the preferred embodiment of the invention is shown in cross-section. The valve box 12 is made up of a valve box base 14, a valve box lower section 16, a valve box upper section 18, and a valve box top 20.

The valve box base 14 has a bottom flange 22 having a plurality of through holes 24 enabling the base 14 to be bolted to a flange (not shown) on the valve, if one is present. The base 14 also has raised flats 26 at two or four equally spaced positions around the top of the base to facilitate strapping the valve box base to the valve or pipeline with pull straps. This will secure the valve box base in place and prevent shifting during backfilling in instances where the valve box base 14 cannot be bolted in place.

The valve box base 14 is secured at its upper end to the valve box lower section 16. FIG. 1 illustrates the use of self tapping screws 28 extending through the overlapping portions of the valve box lower section 16 and the valve box base 14, however, pins or other mechanical connections may be used, or the components may be heat fused or solvent cemented. Heat fusion is the preferred method when the components are made of the same engineering polymer resin. In such situations, the screws 28 would be omitted from the product.

Valve box lower section 16 is preferably a hollow cylindrical element extending upwardly for a distance greater than one-half of the maximum extended length of the valve box assembly. Exact dimensioning of the components to accommodate a wide variety of heights for expected applications will be well within the level of skill in the art, once the operation of the adjustable-height feature of the valve box assembly and extension stem is understood by reading this disclosure. At its upper end 30, valve box lower section 16 preferably has secured thereto a reducer coupling 32, which is secured to the valve box lower section by self-tapping screws 28 or the other securement methods discussed previously.

The reducer coupling 32 preferably has a lower portion sized to fit over the outside of the upper end of the valve box lower section, and has an internal shoulder 34 adapted to abut the upper surface of the valve box lower section to assure proper and secure positioning of the coupling. The upper portion of the coupling 32 is of a reduced internal and external diameter, and is sized to closely surround the outer surface of valve box upper section 18, which extends in telescoping manner within the valve box lower section.

At an upper interior extent of the reducer coupling 32, an O-ring seat 36 is provided to receive an O-ring 37 therein. The O-ring is sized to provide a sliding seal around the outer surface of the valve box upper section 18, to thereby seal the telescoping members to isolate the interior of the members from the exterior environment. Reducer coupling 32 is further provided with an upper exterior threaded section, which is adapted to engage, by threading, a reducer cap 40, which itself is internally threaded and has an upper compression flange 42 extending radially inwardly, and having an opening therein of substantially the same diameter as the inner diameter of the upper portion of reducer coupling 32. It is envisioned that other engagement means may be used in place of the threaded sections on the components, without departing from the scope of the invention.

O-ring seat 36 and O-ring 37 are sized such that the O-ring will protrude above an upper surface 38 of the reducer coupling 32. When configured in this way, the reducer cap 40 can operate to releasably lock the telescoping lower and upper valve box sections 16, 18 at a desired height. When reducer cap 40 is threaded down into contact with, or into a position immediately adjacent, the upper surface 38 of the reducer coupling 32, the compression flange 42 compresses O-ring 37 downwardly, which compresses the O-ring, causing the O-ring to elastically deform and to attempt to further deform radially inwardly and outwardly, thereby causing the O-ring to exert additional compressive forces against the outer surface of valve box upper section 18. This provides sufficient compressive force applied to the valve box upper section to retain the upper section at a desired height relative to the valve box lower section.

The height-adjustment feature of the valve box thus operates by loosening (or reloosening) the reducer cap on the reducer coupling, moving the valve box upper section upwardly or downwardly to achieve the overall desired height of the valve box assembly, and tightening (or retightening) the reducer cap on the reducer coupling to compress (or recompress) the O-ring in its seat.

It should be noted that, while FIG. 1 illustrates the use of a reducer coupling 32 that is a separate element from valve box lower section 16, it is contemplated that the reducer coupling and the lower section could be formed as a single piece, with the upper portion of valve box lower section being swaged down to a reduced diameter, and provided with an inner O-ring seat and external thread cut therein. At present, however, the use of a separate reducer coupling is preferred.

Valve box top 20 is disposed at the upper extent of valve box upper section 18. As illustrated in FIG. 1, valve box top 20 has an upper opening into which cover 44 can be inserted, secured, and, optionally, locked. The valve box top 20 has a wrench nut housing section 46 defined by sidewall 48 and bottom wall 50. Bottom wall 50 has an opening 51 through which the extension stem assembly 110 may extend.

Protruding downwardly from the underside of bottom wall 50 is a sleeve 52 adapted to fit snugly inside valve box upper section 18. The valve box top 20 is substantially permanently secured to the valve box upper section 18 by pinning the sleeve 52 to the valve box upper section 18, as illustrated, or by screws, heat fusion or solvent cement.

Figure 2:
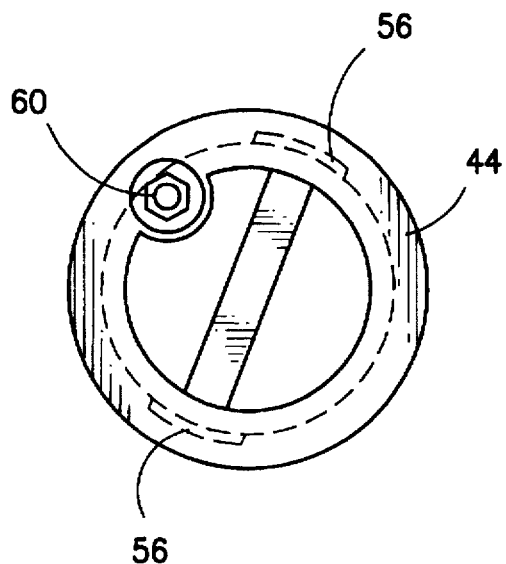
FIG. 2 is a top view of the cover for the valve box in accordance with the preferred embodiment of the present invention.
Figure 3:
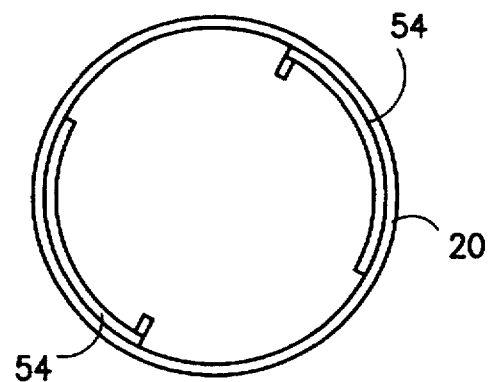
FIG. 3 is a top, substantially schematic, view of the opening at the top of the valve box top, in accordance with the preferred embodiment of the present invention.

The upper opening of valve box top 20 has radially inwardly extending lugs 54 (see FIG. 3) extending around a portion of the inner peripheral surface of the opening. These lugs 54 are adapted to engage outwardly extending lugs 56 (FIGS. 1 and 2) disposed at the under side of cover 44, so that the cover can be dropped into place and turned to lock and secure the cover in place. A cover lock bolt 58 is optionally provided in a threaded bore 60 extending through cover 44. After the cover is dropped in place and turned, the cover lock bolt 58 is then threaded downwardly such that the bottom surface of the bolt engages the underlying flat surface at the opening of the valve box top. This engagement will prevent the cover from being turned until the bolt is unthreaded, and this feature thus provides an additional measure against tampering with the valve box.

The extension stem assembly 100 is disposed inside the valve box, and is designed to automatically adjust in height when the height of the valve box assembly is adjusted. At its lowest extent, extension stem assembly 100 is provided with a valve nut coupling 102, of a cross-section (generally square) and size compatible with the valve nut normally found atop a valve. The valve nut coupling is preferably substantially permanently connected to an extension stem lower section 104, preferably of square cross-section, and of a cross-sectional dimension that enables it to fit inside the valve nut coupling for securement thereto. The illustrated connector is a pin 106 extending through the valve nut coupling and extension stem lower section 104, but other means of connecting the components, such as by welding, will be readily apparent to those skilled in the art.

Extension stem lower section 104 is preferably made of hollow steel mechanical tubing of a square cross-sectional shape. The combined height of the valve nut coupling 102 and extension stem lower section 104, once connected to each other, is preferably approximately the same height as is the valve box base 14 and valve box lower section 16 once those components are connected together, as this height relation will afford a wide range of height adjustability for the overall assembly, and also contributes to the assurance that the overall assembly will remain stable even at maximum extension. Extension stem lower section has, at its upper extent, an extension stem spacer 108 secured thereto which extends inwardly from the wall of the lower section, and which keeps the extension stem upper section 110 properly spaced from the lower section 104.

Extension stem upper section 110 is also preferably made of a hollow steel mechanical tubing that is sized such that the upper section 110 will telescope within the lower section 104. The upper section 110 has, at its lower extent, an extension stem spacer/stop 112 that maintains the lower extent of the upper section essentially centered within the lower section and further cooperates with spacer 108 on the extension stem lower section to act as a stop preventing the extension stem and the valve box assembly from being extended past a predetermined point. This stop will operate to prevent the telescoping extension stem members and valve box upper and lower sections from being overextended to the point of rendering the components structurally unstable and will prevent the components from completely separating.

The upper end 114 of extension stem upper section 110 has a wrench nut 116 surrounding its outer periphery, and being substantially permanently secured thereto, as by a pinned connection, as illustrated, or by other methods. Disposed directly underneath wrench nut 116 is a grit washer 118 which is substantially disc-shaped and has an opening 120 (FIGS. 4A, 4B) in the center thereof that will allow it to snugly engage the outer surface of the extension stem upper section 110. The grit washer 118 may preferably fit tightly around upper section 110, but generally it is preferred that the grit washer not be permanently secured to the upper section.

The grit washer is sized to be larger than the opening 51 in the valve box top, such that it rests on bottom wall 50. The opening 120 in the center of the grit washer is of a smaller dimension than an outer periphery of the wrench nut 116, so that the grit washer 118 will operate to support the extension stem upper section 110 and wrench nut 116 secured to the upper section, at the desired height and amount of extension. It will be readily appreciated that the extension stem upper section 110, being supported at its upper end by the grit washer 118 and bottom wall 50 of the valve box top 20, will automatically move upwardly or downwardly as the valve box upper section 18 is moved upwardly or downwardly in adjusting the height of the valve box assembly to a desired height. The grit washer further substantially prevents loose dirt or foreign objects from entering into the interior of the valve box assembly through opening 51.

Figure 4A:
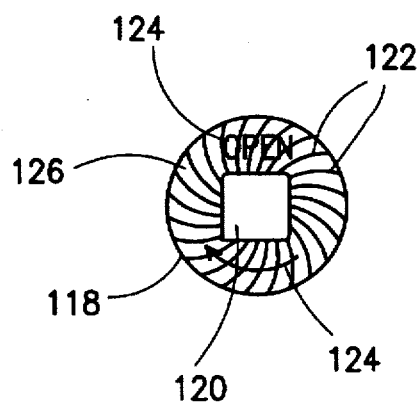
FIGS. 4A and 4B are top and bottom plan views, respectively, of the grit washer in accordance with the preferred embodiment of the present invention.
Figure 4B:
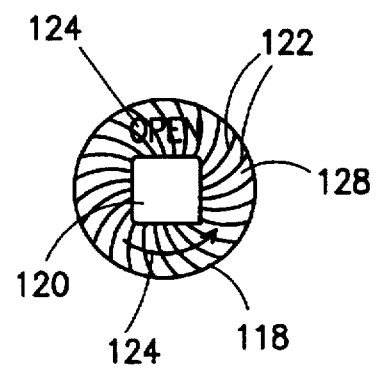

It will be recognized that grit washer 118 supports the weight of extension stem upper section 110 and the wrench nut 116 attached thereto, by its contact with the surface of bottom wall 50. Because the wrench nut 116 and extension stem are turned or rotated to open or close the buried valve, the bottom wall 50 of the valve box top is, in effect, a bearing surface over which grit washer 118 will move when the wrench nut is turned. The flat surfaces of the grit washer 118 are therefore provided with grooves or score lines 122. The grooves 122, which preferably spiral or extend arcuately outwardly as shown in FIGS. 4A and 4B, reduce the area of contact between the grit washer and the bottom wall 50. Further, in the event that dirt or grit finds its way between the grit washer 118 and bottom wall 50, the grooves will capture and channel the grit radially outwardly or inwardly such that the dirt or grit is removed from the region of contact between the grit washer 118 and bottom wall 50.

The grit washer 118 is further provided with markings or other indicia 124, shown in FIGS. 4A and 4B as an arrow and the word "OPEN", providing the valve operator with a visual indication of the proper direction of rotation to open the buried valve. The two flat surfaces 126, 128 of the grit washer are provided with markings showing opposite directions of valve opening, i.e., one surface 126 will indicate a clockwise rotation to open the valve, and the other surface 128 will indicate a counterclockwise rotation. In this manner, the grit washer can be installed with the appropriate side facing upwardly to be viewed by the valve operator, showing which direction of rotation will open the particular buried valve.

A cap or plug 130 may preferably be provided in the opening in the upper end 114 of the extension stem upper section 110, to further prevent dirt and/or other foreign objects from entering the interior of the extension stem assembly. This cap or plug 130 may also be provided with markings or indicia that may be useful to the valve operator.

Valve boxes in the prior art have generally been made of cast iron, which has the disadvantages that it is heavy, and therefore difficult to work with, and that, over time, it is prone to degradation by corrosion. Prior attempts are believed to have been made to substitute plastics for the cast iron material in constructing a valve box, however, the use of plastic has heretofore been disfavored due to its susceptibility to breakage or cracking. In one preferred embodiment of the present invention, an engineering polymer resin is used for the valve box base 14, valve box lower section 16, valve box upper section 18 and valve box top 20. When constructed with a sufficient wall thickness, on the order of ⅛" or above, the engineering polymer resin material will have sufficient strength and impact resistance to avoid cracking or breaking under normal conditions experienced by a valve box. The use of an engineering polymer resin in place of cast iron provides considerable weight savings and improved resistance to corrosion.

In an alternative preferred embodiment of the present invention, at least one standard size of the valve box top 20 is sized such that it can be installed within existing valve boxes, as well. This is seen as being especially advantageous in retrofitting existing valve boxes that were originally installed without an extension stem of any type, and that had previously required the use of an extension wrench, as discussed earlier in the background section of this application.

Figure 5:
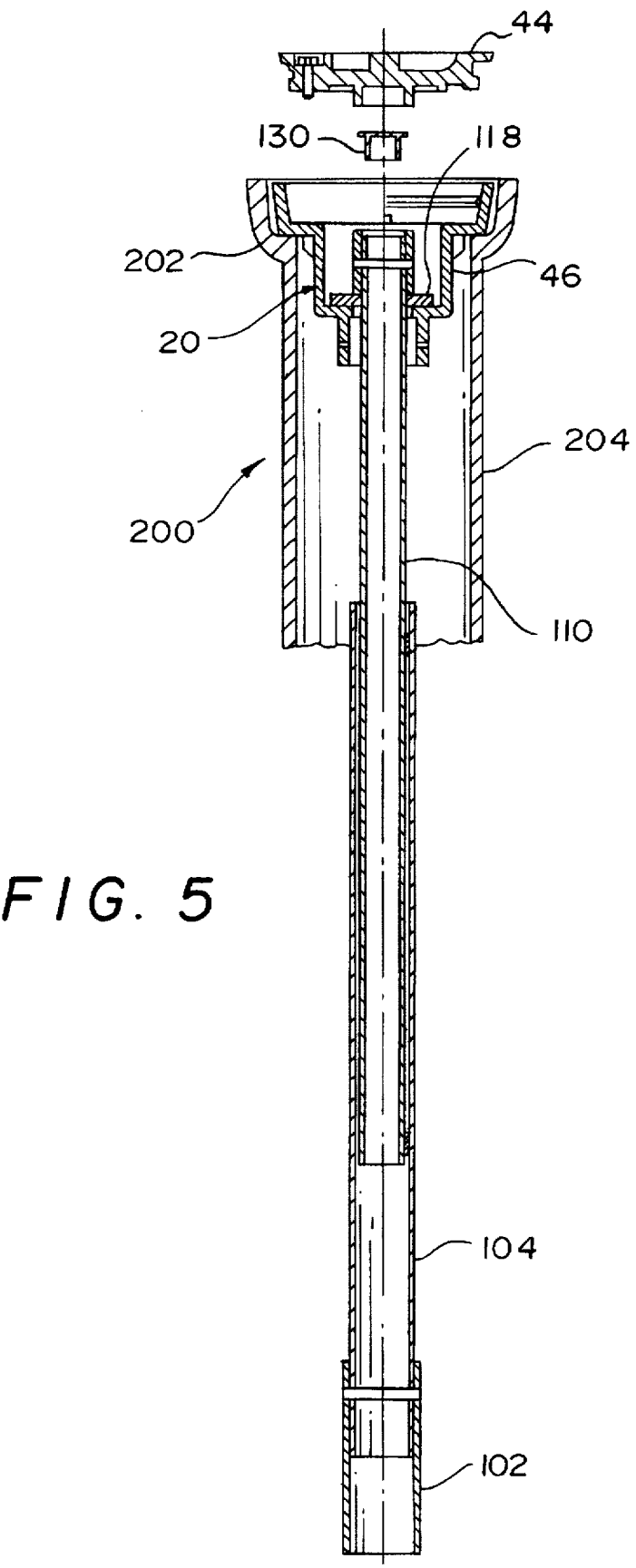
FIG. 5 is a cross-sectional side view of the valve box top and extension stem assembly disposed inside an existing valve box, in accordance with an alternative preferred embodiment of the present invention.

In instances where the valve box top 20 and extension stem assembly 100 are to be retrofitted to an existing valve box, the valve box base 14, lower section 16 and upper section 18 are not provided. Instead, as shown substantially schematically in FIG. 5, the wrench nut housing section 46 of the valve box top seats itself in the upper portion 202 of the existing valve box 200, whereupon the casing 204 of the existing valve box serves to isolate the extension stem assembly from the outside environment. One typical standard size valve box 200 has a seven-inch inner diameter at the upper section 200, which narrows to a six-inch inner diameter in the main length of casing 204. The valve box top of this standard valve box retrofit would thus be slightly under seven inches in outer diameter, and reduced to less than six inches at wrench nut housing section 46. It will be readily apparent that the valve box top 20 can be similarly appropriately sized for existing valve boxes having openings of different sizes.

The preexisting valve box may or may not itself be adjustable, but in any event it will generally already be set at an appropriate height. The adjustability of the extension stem continues to play an important role, however. The use of the extension stem of the present invention enables the use of one, or only a few, standard retrofit kits, as the extension stems will adjust to the various valve box height settings encountered in the field in retrofitting the existing valve boxes.

In retrofitting or installing the valve box top and extension stem assembly, the assembly is lowered into the existing valve box, with the extension stem substantially at full extension. Once the valve nut coupling has engaged the buried valve nut, the telescoping lower and upper extension sections will begin retracting to allow the valve box top 20 to be lowered into and to seat in the valve box 200. The cover 44 may then be installed on the valve box top 20, and will serve as the cover for the entire retrofitted assembly.

The valve box assembly 12 depicted in FIG. 1 is known generally in the art as a sliding-type valve box. A second standard type of adjustable valve box known in the art is the screw-type valve box, in which the two telescoping members are provided with complementary threaded members. Rotating one of the telescoping members relative to the other will cause the members to increase or decrease the overall height of the unit. The valve box and extension stem assembly could be provided with such a screw-type valve box, either with or without the reducer coupling, reducer cap, and sealing and compression O-ring.

It is to be understood that the foregoing description of the preferred embodiments of the present invention is for illustrative purposes, and many variations will become apparent to those of ordinary skill in the art upon reading this disclosure and viewing the figures forming a part of this disclosure. Such variations do not depart from the spirit and scope of the present invention, and the scope of the invention is to be determined by reference to the appended claims.

What is claimed is:

1. An adjustable-height extension stem and valve box assembly comprising:

valve box upper section having a predetermined length, said valve box upper section being open at its interior along said predetermined length, and having an exterior surface of substantially constant and continuous cross-sectional dimension over substantially the entire length thereof;

a valve box lower section having a predetermined length, said valve box lower section being open at its interior along said predetermined length and being sized to receive said valve box upper section into slid interior in a telescoping manner;

a reducer coupling disposed at an upper end of said valve box lower section, said reducer coupling having a reduced internal dimension portion that closely surrounds said exterior surface of said valve box upper member, said reducer coupling further having an O-ring seat at its upper extent, and facing said valve box upper member;

an O-ring seated in said O-ring seat and being of a size such that, in an uncompressed state, said O-ring extends partially beyond said O-ring seat;

a reducer cap, said reducer cap having an inwardly extending flange defining an opening of substantially the same dimension as that of said reduced internal dimension portion of said reducer coupling, said reducer cap and said reducer coupling being so constructed and arranged to allow said reducer cap to releaseably engage said reducer coupling in a manner such that said reducer cap flange is in a locking position immediately adjacent art upper surface of said reducer coupling and such that said reducer cap flange compresses said O-ring disposed in said O-ring seat in said locking position, said O-ring sealingly engaging said exterior surface of said valve box upper section when compressed; wherein when said reducer cap is moved away slightly from said locking position, said O-ring returns to an uncompressed state that allows substantially free movement of said valve box upper section within said valve box lower section; and an extension stem assembly comprising an extension stem upper section and an extension stem lower section, said extension stem upper and lower sections being so constructed and arranged to move in a telescoping manner relative to each other when said valve box upper and lower sections are moved in a telescoping manner, said extension stem upper section having a wrench nut adapted to be engaged by a wrench used to rotate said extension stem assembly in operating a buried valve, and said extension stem lower section having a valve nut coupling adapted to engage a valve nut of a buried valve.

2. An extension stem and valve box assembly as recited in claim 1, wherein said reducer cap is internally threaded and said reducer coupling is externally threaded, whereby said reducer cap is moved into and away from said locking position by rotating the reducer cap, with the threaded engagement of said reducer cap and reducer coupling thereby causing said reducer cap to move vertically.

3. An extension stem and valve box assembly as recited in claim 2 wherein said reducer coupling is a separate element from said valve box lower section, and said reducer coupling extends downwardly around an upper extent of said lower section, and said reducer coupling is substantially permanently secured to said valve box lower section.

4. An extension stem and valve box assembly as recited in claim 1, further comprising a valve box base substantially permanently attached to said valve box lower section at a lower extent of said valve box lower section, said valve box base being so constructed and arranged to fit over an upper portion of a buried valve, said valve box base further having a plurality of spaced, raised flats extending above, and spaced around a top of, said valve box base, each of said raised flats having a surface for receiving a strap, enabling the use of straps to secure said valve box base to said buried valve.

5. An extension stem and valve box assembly as recited in claim 4, wherein said valve box base further comprises an outwardly extending flange at a lower extent of said valve box base, said flange having a plurality of throughbores adapted to receive bolts therethrough.

6. An extension stem and valve box assembly as recited in claim 1, further comprising a valve box top substantially permanently secured to an upper extent of said valve box upper section, said valve box top having a bottom wall, said bottom wall having an opening therein through which extension stem upper section extends.

7. An extension stem and valve box assembly as recited in claim 6, wherein said extension stem upper section has a grit washer secured thereto at a position above said opening in said bottom wall of said valve box top, said grit washer having a diameter larger than said opening in said bottom wall, whereby a first bearing surface of said grit washer engages said bottom wall and said extension stem upper section is retained in position and is supported by said engagement of said grit washer with said bottom wall of said valve box top.

8. An extension stem and valve box assembly as recited in claim 4, wherein said strap receiving surface of each of said plurality of raised flats is recessed on said flat, and is spaced radially inwardly of an outer edge of said flat.

9. An extension stem and valve box assembly as recited in claim 6, further comprising a valve box cover, and wherein said valve box top and said valve box cover have complementary lugs adapted to allow said valve box cover to be secured to said valve box top, and wherein said valve box cover further has means for locking said cover to said valve box top.

10. An extension stem and valve box assembly as recited in claim 1, wherein said extension stem upper section is constructed of hollow square metal tubing, and said extension stem lower section is constructed of hollow square metal tubing, said extension stem lower section having a square hollow interior of a sufficient size to loosely surround said extension stem upper section when said upper and lower sections are placed in a telescoping relation.

11. An extension stem and valve box assembly as recited in claim 10 wherein said extension stem upper section has a first spacer element disposed on an exterior surface of a lower extent of said upper section and spanning a gap between said upper section and said lower section, and wherein said extension stem lower section has a second spacer element disposed on an interior surface of an upper extent of said lower section, and spanning said gap between said upper section and said lower section, and wherein said first and second spacer elements are so constructed and arranged to come into contact with each other when said extension stem upper section and said extension stem lower section are moved to a fully extended position.

12. An extension stem and valve box assembly as recited in claim 1 wherein said valve box upper section, said valve box lower section, said reducer coupling and said reducer cap are made of an engineering polymer resin.

13. An adjustable-height extension stem and valve box assembly comprising:

a valve box upper section having a predetermined length, said valve box upper section being open at its interior along said predetermined length;

a valve box lower section having a predetermined length, said valve box lower section being open at its interior along said predetermined length and being sized to receive said valve box upper section into said interior in a telescoping manner;

a reducer coupling disposed at an upper end of said valve box lower section, said reducer coupling having a reduced internal dimension portion that closely surrounds an exterior surface of said valve box upper member, said reducer coupling further having an O-ring seat at its upper extent, and facing said valve box upper member;

an O-ring seated in said O-ring seat and being of a size such that, in an uncompressed state, said O-ring extends partially beyond said O-ring seat;

a reducer cap, said reducer cap having an inwardly extending flange defining an opening of substantially the same dimension as that of said reduced internal dimension portion of said reducer coupling, said reducer cap and said reducer coupling being so constructed and arranged to allow said reducer cap to releaseably engage said reducer coupling in a manner such that said reducer cap flange is in a locking position immediately adjacent an upper surface of said reducer coupling and such that said reducer cap flange compresses said O-ring disposed in said O-ring seat; and an extension stem assembly comprising an extension stem upper section and an extension stem lower section, said extension stem upper and lower sections being so constructed and arranged to move in a telescoping manner relative to each other when said valve box upper and lower sections are moved in a telescoping manner, said extension stem upper section having a wrench nut adapted to be engaged by a wrench used to rotate said extension stem assembly in operating a buried valve, and said extension stem lower section having a valve nut coupling adapted to engage a valve nut of a buried valve;

a valve box top substantially permanently secured to an upper extent of said valve box upper section, said valve box top having a bottom wall, said bottom wall having an opening therein through which extension stem upper section extends;

wherein said extension stem upper section has a grit washer secured thereto at a position above said opening in said bottom wall of said valve box top, said grit washer having a diameter larger than said opening in said bottom wall, whereby a first bearing surface of said grit washer engages said bottom wall and said extension stem upper section is retained in position and is supported by said engagement of said grit washer with said bottom wall of said valve box top; and wherein said first bearing surface of said grit washer has a plurality of grooves extending in a generally radial direction along said first surface, wherein said plurality of grooves are sized to receive grit particles therein, and to channel grit particles away from said first bearing surface when said grit washer is rotated.

14. An extension stem and valve box assembly as recited in claim 13, wherein each of said plurality of grooves on said first bearing surface is curved in a substantially arcuate manner.

15. An extension stem and valve box assembly as recited in claim 8 wherein said grit washer has a second bearing surface opposite and parallel to said first bearing surface, said second bearing surface having a plurality of grooves extending in a generally radial direction along said second surface.

16. An extension stem and valve box assembly as recited in claim 15 wherein said first bearing surface has directional indicia appearing thereon indicating that rotation in a clockwise direction will open a valve buried underneath said assembly, and said second bearing surface has directional indicia appearing thereon indicating that rotation in a counterclockwise direction will open a valve buried underneath said assembly.

17. An adjustable height extension stem assembly adapted to be installed in a valve box, comprising:

a valve box top having a upper portion and a lower portion, said lower portion having a smaller outer diameter than said upper portion, said upper portion being adapted to seat at an upper extent of an existing valve box, and said lower portion being adapted to extend inwardly into said valve box when said upper portion is seated, said lower portion having a bottom wall having an opening therein;

an extension stem upper section extending from interior of said valve box top downwardly through said in said bottom wall of said valve box top, an extension stem lower section extending downwardly from said extension stem upper section, said extension stem upper and lower sections being so constructed and arranged to freely move in a telescoping manner relative to each other, wherein said extension stem upper and lower sections each has a spacer element disposed thereon substantially spanning a gap between said extension stem upper and lower members, a first spacer element being disposed on a lower extent of said extension stem upper section and a second spacer element being disposed on an upper extent of said extension stem lower section, and wherein said first and said second spacer elements are so constructed and arranged to come into contact with each other when said extension stem upper section and said extension stem lower section are moved to a fully extended position;

a substantially planar grit washer secured at an upper extent of said extension stem upper section and disposed within said interior of said valve box top, said grit washer having a diameter larger than said opening in said bottom wall of said valve box top, thereby retaining and supporting said upper extent of said extension stem upper section in position within said interior of said valve box top said grit washer being so constructed and arranged to remove grit from a bottom wall of said valve box top when said extension stem upper section is rotated;

said extension stem upper section having a wrench nut at said upper extent adapted to be engaged by a wrench used to rotate said extension stem assembly in operating a buried valve, and said extension stem lower section having a valve nut coupling at a lower extent thereof adapted to engage a valve nut of a buried valve.

18. An adjustable height extension stem assembly as recited in claim 17, wherein said extension stem upper section is constructed of hollow square metal tubing, and said extension stem lower section is constructed of hollow square metal tubing, said extension stem lower section having a square hollow interior of sufficient size to loosely surround said extension stem upper section.

19. An adjustable height extension stem assembly adapted to be installed in a valve box, comprising:

a valve box top having a upper portion and a lower portion, said lower portion having a smaller outer diameter than said upper portion, said upper portion being adapted to seat at an upper extent of an existing valve box, and said lower portion being adapted to extend inwardly into said valve box when said upper portion is seated, said lower portion having a bottom wall having an opening therein;

an extension stem upper section extending from an interior of said valve box top downwardly through said opening in said bottom wall of said valve box top, an extension stem lower section extending downwardly from said extension stem upper section, said extension stem upper and lower sections being so constructed and arranged to freely move in a telescoping manner relative to each other, wherein said extension stem upper and lower sections each has a spacer element disposed thereon substantially spanning a gap between said extension stem upper and lower members, a first spacer element being disposed on a lower extent of said extension stem upper section and a second spacer element being disposed on an upper extent of said extension stem lower section, and wherein said first and said second spacer elements are so constructed and arranged to come into contact with each other when said extension stem upper section and said extension stem lower section are moved to a fully extended position;

a grit washer secured at an upper extent of said extension stem upper section and disposed within said interior of said valve box top, said grit washer having a diameter larger than said opening in said bottom wall of said valve box top, thereby retaining and supporting said upper extent of said extension stem upper section in position within said interior of said valve box top;

said extension stem upper section having a wrench nut at said upper extent adapted to be engaged by a wrench used to rotate said extension stem assembly in operating a buried valve, and said extension stem lower section having a valve nut coupling at a lower extent thereof adapted to engage a valve nut of a buried valve, and wherein said grit washer has a first substantially planar bearing surface in contact with said bottom wall of said valve box top, and said first bearing surface contains a plurality of grooves therein extending substantially radially along said surface, wherein said plurality of grooves are sized to receive grit particles therein, and to channel grit particles away from said first bearings surface when said retaining washer is rotated.

20. An adjustable height extension stem assembly as recited in claim 19 wherein each of said plurality of grooves extends radially in an arcuate manner.

* * * * *

UNITED STATES PATENT AND TRADEMARK OFFICE
CERTIFICATE OF CORRECTION

PATENT NO. : 5,738,140
DATED : APRIL 14, 1998
INVENTOR(S) : Jerry Thomas MANN

It is certified that error appears in the above-indentified patent and that said Letters Patent is hereby corrected as shown below:

Claim 1, line 20, "slid" should be --said--
Claim 1, line 40, "art" should be --an--

Signed and Sealed this

Twenty-ninth Day of December, 1998

Attest:

BRUCE LEHMAN

Attesting Officer

Commissioner of Patents and Trademarks